United States Patent [19]

Hohlfeld et al.

[11] 3,950,594

[45] Apr. 13, 1976

[54] DIELECTRIC COATING COMPOSITION

[75] Inventors: Ronald W. Hohlfeld; Dieter H. Klein, both of Midland, Mich.

[73] Assignee: The Dow Chemical Company, Midland, Mich.

[22] Filed: May 31, 1973

[21] Appl. No.: 365,791

[52] U.S. Cl. ................. 428/511; 252/63.2; 252/65; 428/537

[51] Int. Cl.[2] ....................... H01B 3/00; B32B 23/08

[58] Field of Search ................... 252/63.2; 260/87.7; 106/294; 428/511

[56] References Cited

UNITED STATES PATENTS

| | | | |
|---|---|---|---|
| 3,084,065 | 4/1963 | Bach | 260/87.7 |
| 3,251,817 | 5/1966 | Hahn et al. | 260/87.7 |

*Primary Examiner*—Richard D. Lovering
*Assistant Examiner*—Josephine Lloyd
*Attorney, Agent, or Firm*—Ronald G. Brookens

[57] ABSTRACT

A dielectric coating for use on electroconductive papers consisting essentially of an interpolymer containing about 80 parts by weight of vinylidene chloride and at least about 1 part by weight of a vinyl acid, said interpolymer being obtained by polymerization in non-aqueous dispersion (NAD) comprising a strongly hydrogen bonded dispersing media containing from about 0.1 to 20 percent of a preformed dispersion stabilizer comprising the reaction product of (A) tripropylene glycol methylether acrylate and (B) at least one reactive comonomer capable of forming a side chain on said stabilizer which side chain is dispersible in said vinylidene chloride interpolymer and wherein the mass ratio of (A) to (B) is from about 99:1 to 80:20.

8 Claims, No Drawings

DIELECTRIC COATING COMPOSITION

BACKGROUND OF THE INVENTION

Electrographic paper for use in electrostatic printing, said paper being formulated to look like ordinary paper, consists of a paper substrate generally made conductive by the addition thereto of electroconductive resins or salts and on the top of which is placed a highly resistive dielectric resin coating. Generally these papers contain a pigment, the purpose of which is to reduce the gloss of the polymer coating and to give the paper a flat, matte-type finish. The resulting paper can be of any size, depending upon the requirements of the machine.

In a typical printing process, the paper is passed through an electrographic printer. Voltage in the range of 100–900 volts is applied across the dielectric coating. One process has an electrode making contact with the electroconductive substrate, and the other electrode, consisting of styli which are selectively activated by programmed impulses, is in proximity with the dielectric coating. An electrical discharge occurs across the air gap, resulting in an electrostatic image on the surface of the paper.

An alternative process charges the dielectric layer through one stylus, with the return path through another electrode on the same side of the paper.

The dielectric layer functions as a charged capacitor, the charged paper then being passed through a toner containing oppositely charged particles, The particles adhere to the electrostatic image, resulting in a visible print.

There are many dielectric materials which, when coated on paper at about 50 percent room humidity, will accept a static charge and produce a toned image. Any fairly good dielectric will hold sufficient charge long enough to be toned out in a few minutes to produce a visible print.

But when the coated papers are run through high speed printers (e.g., 5,800 lines per minute) and when the humidity to which the paper is subjected begins to vary over a range of about 10 to 85 percent, each component of the electrographic system begins to have critical requirements.

At low humidity the conductivity of the base sheet must be provided solely by the electroconductive resin with which it is impregnated. Conductivity of the base sheet determines the time required to transfer charge to the dielectric. The dielectric coating must be capable of being charged in a matter of about 50 microseconds. As the humidity goes up to 80 percent and higher, other problems become paramount. For instance, the papers begin to exhibit curl problems and the charge leaks off and through the paper much more quickly. In addition, parts of the dielectric coating lose their dielectric strength and break down at voltage levels which are inadequate for printing.

Past experience has shown that many soft resins, such as vinylidene chloride copolymers, while they do not curl the paper excessively, will not adequately receive and maintain an electrical charge under high humidity conditions. On the other hand, while many hard resins, such as epoxy resins, will receive and maintain a charge, they exhibit excessive curl under these conditions.

Coatings prepared from blends of vinylidene chloride polymers and hard resin such as epoxy resins, have been found to provide desirable charge acceptance and retention along with good image density, resolution and appearance, under conditions of relatively high humidity. Such coatings, however, still tend to curl and the polymeric ingredients of such coatings have only limited solubility in conventional organic solvents from which such coatings are cast with resultant requirements for recovery of relatively large amounts of such solvents.

SUMMARY OF THE INVENTION

Dielectric coatings have now been found which provide desirable charge acceptance and retention along with good image density, resolution and appearance when such coatings and their associated substrate are exposed to relatively high humidities, i.e., above about 50 percent; and which, in addition, exhibit substantially no paper curl. Further, the polymeric ingredients of such coatings have significantly increased solubility in conventionally used organic solvents with little or no increase in solution viscosity and with lessened requirements for solvent recovery.

The coatings of this invention comprise essentially an interpolymer containing essentially about 80 parts by weight vinylidene chloride and at least about 1 part by weight of a vinyl acid compound, such interpolymers being prepared by polymerizing the monomeric constituents thereof in a non-aqueous dispersion (NAD) comprising a strongly hydrogen bonded dispersing media containing from about 0.1 to 20 percent of a preformed dispersion stabilizer comprising the reaction product of (A) tripropylene glycol methylether acrylate and (B) at least one reactive comonomer capable of forming a side chain on said stabilizer which side chain is dispersible in said vinylidene chloride polymer and wherein the mass ratio of (A) to (B) is from about 99:1 to 80:20.

DESCRIPTION OF THE PREFERRED EMBODIMENTS

The interpolymers forming the improved dielectric coatings of the present invention necessarily contain, for obtention of desired properties, about 80 parts by weight of vinylidene chloride and at least about 1 part by weight of vinyl acid, with any remainder being one or more monoethylenically unsaturated comonomer. Exemplary of particularly useful vinyl acids are acrylic acid, methacrylic acid and itaconic acid. Such acids may also be substituted at least in part with functional monomers such as maleic anhydride and hydroxyacrylates and methacrylates such as hydroxy ethyl acrylate, hydroxy propyl acrylate, hydroxy butyl acrylate and the corresponding hydroxy alkyl methacrylates. Exemplary of preferred monoethylenically unsaturated comonomers are vinyl chloride methyl acrylate, methyl methacrylate, ethyl acrylate, n-butyl acrylate and methacrylate, octyl acrylate, acrylonitrile and methacrylonitrile.

Especially preferred interpolymers contain about 80 parts by weight vinylidene chloride, about 2 to 20 parts by weight acrylic acid or methacrylic acid and about 0–18 parts by weight of methyl acrylate or acrylonitrile. Optimum performance in pigmented coatings is obtained, however, using an interpolymer of about 80 parts by weight vinylidene chloride, from about 3 to 7 parts by weight of acrylic acid and from about 13 to 17 parts by weight of methyl acrylate.

The tripropylene glycol methylether acrylate component of the dispersion stabilizer (A) used in the preparation of such interpolymers is essential for achieving adequate solubility in the organic hydrophilic liquid. It is to be understood that such compound may contain small amounts of homologous materials having somewhat higher molecular weight.

Where the dispersing media is highly polar in nature, e.g., methyl, ethyl, propyl, or n-butyl alcohol, the suitable solvatable chain is composed of tripropylene glycol methylether acrylate and a comonomer X. X may be a reactive monomer such as acrylic acid, methacrylic acid, maleic anhydride, glycidly methacrylate or an aziridine compound of the formula

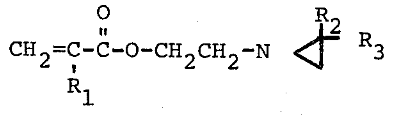

(such compounds are prepared by reaction of aziridinyl alcohols and methyl esters of acrylic or methacrylic acid); or a compound having the formula

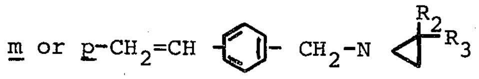

(such compounds are prepared by reaction of ar-vinylbenzyl chloride or bromide and an aziridine in the presence of excess aziridine and a base such as KOH); or a compound having the formula

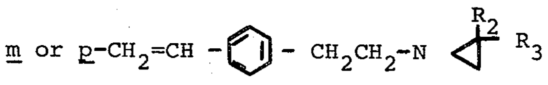

(such compounds are prepared by reaction of an aziridine and divinylbenzene. In the above formulas, $R_1$ is hydrogen or $CH_3$; $R_2$ is hydrogen or lower alkyl, e.g., 1 to 4 carbon atoms); and $R_3$ is hydrogen or lower alkyl, e.g., 1 to 4 carbon atoms.

Preferred compounds, for the aziridine compounds above, are those wherein $R_2$ is hydrogen and $R_3$ is methyl or ethyl. Especially preferred compounds are those wherein $R_2$ and $R_3$ are both hydrogen.

The compound X in the copolymer then may be reacted with compound Y. If X is a monomer containing a carboxyl group Y may be an aziridine compound as set forth above, e.g., 2-(1-aziridinyl ethyl)methacrylate, or vinyl benzyl aziridine, or an acrylate such as glycidyl methacrylate, and the like. If X contains an anhydride group Y may be: hydroxy ethyl, hydroxy propyl, hydroxy butyl acrylate or methacrylate or aminoethyl methacrylate, etc. If X is glycidyl methacrylate or an aziridine compound as set forth above, e.g., 2-(1-aziridinyl ethyl)methacrylate or vinyl benzyl aziridine, Y may be: acrylic acid, methacrylic acid, aminoethyl methacrylate, itaconic acid, etc. Y serves to hook on a polymerizable group on the solvatable backbone of tripropylene glycol methylether acrylate — X copolymer. The resulting polymer is a precursor. The precursor may be used in this form or it may be used as a preformed graft polymer. The precursor in this case is reacted with monomers which as a homopolymer would be only partially or not at all soluble in the diluent in which the polymerization is carried out. In order to charge the precursor or preformed graft stabilizer basic, it is preferred that X or Y may be a basic monomer such as an aziridine compound as disclosed herein. If a preformed graft polymer is formed, it is of advantage to copolymerize some of these previously mentioned basic charged copolymers. The ratio of tripropylene glycol methylether acrylate to X may be 99:1 to 80:20 but the preferred ratio is 97:3 to 99:1. The amount of Y depends of course on the amount of X. Generally it is preferred to use Y in the theoretical excess of 10 percent.

Where the dispersing media is semipolar in nature such as mixtures of hydrocarbon and alcohol, ethyl acetate, ethylene glycol ether acetate, ethylene glycol butyl ether, etc., some of the tripropylene glycol methylether acrylate may be substituted with other monomers such as poly(12-hydroxy stearic acid)acrylate, lauryl acrylate or methacrylate, stearyl methacrylate, ethylhexyl acrylate or methacrylate to make the polymer backbone of the stabilizer solvatable in the semipolar solvents.

Using the selected stabilizer precursor or preformed graft stabilizer as described above, stable dispersions of polymer of fine particle size may be formed even if the solvated chains are present in a proportion of as low as 0.1 percent by weight of the disperse polymer. Preferably the proportion of solvated chains in the dispersion is from 0.25 percent to 6 percent but it may be as high as 20 percent by weight of the disperse polymer.

The molecular weight of the precursor preferably is between 10,000–40,000. But precursors having a molecular weight of lower than 10,000 or higher than 40,000 have been shown to be operable. It has further been found that it is easier to obtain a stable dispersion if the reactivity ratios of the monomers to be polymerized and the unsaturated group of the stabilizer precursor (Y) are approximately unity.

The total diluent composition utilized in the present invention should contain at least about 65 percent by weight of a strongly hydrogen bonded material. Any remainder may be a poorly hydrogen bonded and/or moderately hydrogen bonded solvent or mixtures thereof. Some of the solvents which may be used in this invention are summarized on the following table:

| Solvent | Solubility Parameter $\Upsilon$ | Hydrogen Bonding Index | Classification |
|---|---|---|---|
| Hexane | 7.3 | 2.1 | |
| Isopar E (Isooctane) | 7.1 | 2.5 | |
| VM&P Naphtha | 7.6 | 2.5 | Poorly |
| High boiling aromatics | 8.5 | 2.5 | Hydrogen |
| Toluene | 8.9 | 3.3 | Bonded |
| Xylene | 8.8 | 3.5 | |
| Ethyl | 9.1 | 5.2 | |
| Methyl Ethyl Ketone | 9.3 | 5.4 | |
| Acetone | 10.0 | 5.9 | |
| Isopropyl acetate | 8.4 | 6.0 | Moderately |
| Ethylene glycol ether acetate | 8.7 | 6.5 | Hydrogen Bonded |
| Diacetone alcohol | 9.2 | 6.8 | |
| Ethylene glycol butyl ether | 8.9 | 7.0 | |
| Ethanol | 12.7 | 8.5 | Strongly |
| Butanol (iso) | 10.5 | 8.5 | Hydrogen |
| Butanol (n) | 11.4 | 8.5 | Bonded |
| Isopropanol | 11.5 | 8.7 | |
| $H_2O$ | None | >9.0 | |

Hydrogen bonding indexes are assigned arbitrarily and as can be seen on the preceding table may be used to classify solvents into three groups: poorly, moderately and strongly hydrogen bonded.

The dielectric coatings of the present invention may suitably be prepared by dissolving the prescribed vinylidene chloride interpolymer in a suitable solvent. A mineral or synthetic pigment, generally in amounts of up to about 2 parts by weight per part of interpolymer may be dispersed in the solution by known techniques, such as sand milling. Ambient conditions are generally suitable for the above process.

Suitable solvents include aromatic solvents such as toluene, the ketones such as methyl ethyl ketone, preferably in admixture with toluene; the cyclic ketones as disclosed in U.S. Pat. No. 3,635,872; and tetrahydrofuran, dimethylformamide, ethyl acetate and the like.

The dielectric coatings of this invention are generally applied to the electroconductive paper in an amount of from about 2 to about 7 pounds and preferably between about 5 and 7 pounds per 3,000 square feet of such paper.

The following non-limiting example will serve to further illustrate the present invention.

EXAMPLE

1. Preparation of Dispersion Stabilizer Precursor 1200 parts isooctane were heated to 115°C. in a vessel fitted with stirrer and reflux condenser. During 5 hours a mixture of 697 parts of tripropylene glycol methylether acrylate and 7 parts of 2-(1-aziridinyl ethyl)methacrylate and 1.4 parts of α(t-butylazo)isobutyronitrile was added at a constant rate. The mixture was heated for an additional hour to ensure complete reaction. 4.1 parts acrylic acid were mixed with 0.5 part hydroquinone and added immediately afterwards with vigorous stirring. The liquid was heated to reflux for another 3 hours and then cooled. The suspension was then allowed to stand for 5 hours to allow the liquids to separate. The lower layer was decanted and vacuum stripped until solids content reached 90 percent.

2. Preparation of Vinylidene Chloride Interpolymers

In each of several experiments to individual polymerization reactors were added: 35 parts by weight methanol, 5.5 parts by weight of the precursor solution of (1) above, 0.5 part by weight of azobisisobutyronitrile and varying amounts of vinylidene chloride ($VeCl_2$), acrylic acid (AA) and methyl acrylate (MA). The reactors were then closed and the contents agitated while maintaining a temperature of about 65°C. After about 12 hours the reactors were cooled to a temperature of about 25°C. A fine particle size latex containing about 70 percent solids was obtained in each instance. The interpolymeric solids were then recovered and dried. The following Table I sets forth the compositions of such interpolymers:

TABLE I

| Sample Designation | Interpolymer Composition (parts by weight) |
|---|---|
| B (WP) | 80 $VeCl_2$/20 MA |
| C (DS) | 80 $VeCl_2$/19 MA/1 AA |
| D (WP) | 80 $VeCl_2$/19 MA/1 AA |

TABLE I – Continued

| Sample Designation | Interpolymer Composition (parts by weight) |
|---|---|
| E (WP) | 80 $VeCl_2$/17 MA/3 AA |
| F (DS) | 80 $VeCl_2$/15 MA/5 AA |
| G (WP) | 80 $VeCl_2$/15 MA/5 AA |
| H (WP) | 80 $VeCl_2$/13.3 MA/6.7 AA |

WP — Interpolymer recovered by precipitation with water
DS — Interpolymer recovered by direct separation from the latex 3. Preparation and Evaluation of Dielectric Coatings Portions of Samples B through H were then separately and individually dissolved in a solvent composed of 95 parts by weight toluene and 5 parts by weight methyl ethyl ketone to a total solids content of 40 percent. Lithopone 40M was then added to each solution in an amount sufficient to provide a pigment to polymer ratio of 1 to 1 using a ball mill. The ball mill time was about twenty-four hours per formulation. The resulting dispersions were then applied on conductivized paper. The application method used was by draw-down bars.

A comparative material (Sample A) was prepared by adding 40 gms. of a copolymer of 80 percent vinylidene chloride and 20 percent of acrylonitrile to 160 ml. of methyl ethyl ketone in a bottle equipped with a magnetic stirrer. The solution was stirred for one hour and then 10 gms. of an epoxy resin of the formula

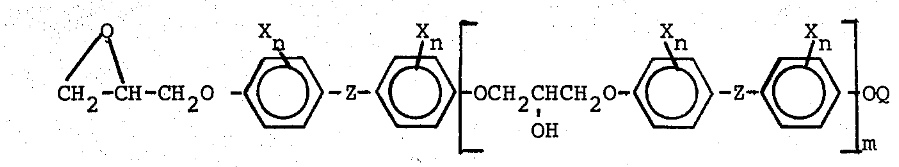

wherein $n$ is O, Z is isopropylidene and the epoxy equivalent weight is above 1800, was added, and the stirring continued for another hour. Lithopone pigent was then added and the material applied to the paper substrate as described above.

The following Table II depicts solvent used, percent interpolymer solids, pigmentation/resin ratio and coating weights of the dielectric coatings described above.

TABLE II

| Sample | Solvent Ratio Toluene/MEK | % Solids | Pigment/ Resin Ratio | Coat Weight lbs/3000 Sq. Ft. |
|---|---|---|---|---|
| A | 30/70[1] | 30 | 0.7/1 | 5.0 |
| B (WP) | 95/5 | 40 | 1/1 | 6.1 |
| C (DS) | 95/5 | 40 | 1/1 | 5.9 |
| D (WP) | 95/5 | 40 | 1/1 | 6.1 |
| E (WP) | 95/5 | 40 | 1/1 | 6.0 |
| F (DS) | 95/5 | 40 | 1/1 | 5.9 |
| G (WP) | 95/5 | 40 | 1/1 | 6.1 |
| H (WP) | 95/5 | 40 | 1/1 | 6.1 |

[1] insoluble in 95/5 Toluene/MEK mixture

As evidenced by the above data, the vinylidene chloride interpolymers (Samples B through H) are characterized by significantly enhanced solubility in aromatic solvents and permit greater coating weights from a single solution application, as compared to Comparative Sample A.

The following Table III lists charge retention (Volts) vs. time data for the dielectric coatings of Table II. Charge retention data was gathered using the Most Associates Stati-Tester, Model 169.

TABLE III

| Sample | Residual Charge (Volts) 5 Sec* | 5 Sec | 10 Sec | 15 Sec | 30 Sec | 60 Sec | 120 Sec |
|---|---|---|---|---|---|---|---|
| For Comparison | | | | | | | |
| A | 265 | 210 | 195 | 190 | 170 | 150 | 130 |
| B (WP) | 140 | 50 | 40 | 30 | 20 | 15 | 5 |
| The Invention | | | | | | | |
| C (DS) | 175 | 100 | 85 | 75 | 60 | 50 | 35 |
| D (WP) | 240 | 170 | 145 | 130 | 100 | 85 | 70 |
| E (WP) | 270 | 200 | 180 | 165 | 130 | 115 | 95 |
| F (DS) | 195 | 150 | 135 | 125 | 110 | 90 | 75 |
| G (WP) | 240 | 195 | 180 | 165 | 140 | 125 | 105 |
| H (WP) | 305 | 240 | 220 | 205 | 180 | 155 | 130 |

*Corona on for first 5 seconds.

The above data illustrate that by use of at least about 3 parts by weight of acrylic acid in the interpolymers of the present invention (Samples E through H), optimum charge retention characteristics are obtained. Further, in all instances where the interpolymers were water precipitated from their original dispersions rather than directly separated, better initial charge acceptance and charge retention characteristics were obtained. The acrylic acid containing interpolymers (Samples E through H) were further characterized by optimum charge acceptance and equal charge retention characteristics when compared to the formulation (Samples A through D).

The following Table IV sets forth the image characteristics of the dielectric coatings of Table II. The image density data was compiled using a Photovolt Brightness Meter Model 610. Resolution and appearance comparisons were subjectively evaluated using a small hand microscope (20x).

What is claimed is:

1. A dielectric coating for use on electroconductive paper comprising an interpolymer of from about 80 parts by weight vinylidene chloride, at least about 1 part by weight of a vinyl acid with any remainder being one or more monoethylenically unsaturated comonomer, said interpolymer being obtained by polymerizing the monomeric constituents of said interpolymer in a strongly hydrogen bonded dispersing media containing from about 0.1 to 20 percent of a preformed dispersion stabilizer comprising the reaction product of (A) tripropylene glycol methylether acrylate and (B) at least one reactive comonomer capable of forming a side chain on said stabilizer which side chain is dispersible in said vinylidene chloride polymer and wherein the mass ratio of (A) to (B) is from about 99:1 to 80:20.

2. The dielectric coating of claim 1 containing at least about 3 parts by weight of vinyl acid.

TABLE IV

| ample | % Image Density 50% RH | 75% RH | 85% RH | Resolution 50% RH | 75% RH | 85% RH | Appearance 50% RH | 75% RH | 85% RH |
|---|---|---|---|---|---|---|---|---|---|
| or Comparison | | | | | | | | | |
| A | 90 | 80 | 20 | G | G | Bad | SS | SS | B |
| 3 (WP) | 80 | 60 | 15 | G | G | Bad | SS | SS/SB | B |
| he Invention | | | | | | | | | |
| : (DS) | 85 | 50 | 25 | G | P | Bad | SS | M/SS | B |
| ) (WP) | 85 | 50 | 20 | G | P | Bad | SS | SS | B |
| : (WP) | 85 | 60 | 20 | G | G | P | SS | S | B |
| ' (DS) | 85 | 35 | 30 | G | P | Bad | SS | M/SS | B |
| i (WP) | 85 | 45 | 25 | G | G | Bad | SS | S/M | B |
| I (WP) | 85 | 75 | 35 | G | G | G | G | G | SB/M |

i = good; P = Poor; S = Smudge; SS = Slight Smudge; SB = Slight Coating Breakdown;
= Coating Breakdown; M = Mottle.

The above data illustrate that the interpolymers con-:aining at least about 3 parts by weight of acrylic acid 'Samples E through H) are characterized by optimum maging characteristics of the systems tested. No imag-ng differences were seen between water precipitated ınd directly separated interpolymers.

The data presented in Tables III and IV above estab-ish that the dielectric coatings of the present invention Samples C through H) are at least of comparable effectiveness as compared to Sample A with regard to :harge acceptance, charge retention, image density, esolution and appearance. Such data further illustrates hat those interpolymers containing at least about 3 ›arts by weight of acrylic acid are preferred (Samples E hrough H). Further, it has been discovered that use of ıny of the dielectric coatings of the present invention ignificantly reduces the amount of paper curl at higher ıumidities. Still further, the prescribed interpolymers orming such coatings have significantly enhanced sol-ıbility characteristics in aromatic solvents, such as oluene, which provides significant economic advanat-ıges.

3. The dielectric coating of claim 2 wherein said vinyl acid is acrylic acid.

4. The coating of claim 3 wherein said interpolymer contains from about 3 to 7 parts by weight of acrylic acid and from about 13 to 17 parts by weight of methyl acrylate.

5. The coating of claim 4 having in addition thereto and in combination therewith up to about 2 parts by weight of a pigment per part of said interpolymer.

6. The coating of claim 5 wherein said pigment is lithopone.

7. The coating of claim 6 wherein said coating is substantially uniformly applied to said electroconductive paper in an amount of from about 2 to about 7 pounds per 3000 square feet of said electroconductive paper.

8. A paper suitable for use in electrostatic printing processes comprising an electrographic paper coated on at least one side with an effective amount of the dielectric coating composition of claim 1.

* * * * *